(12) United States Patent
Babu et al.

(10) Patent No.: US 10,863,008 B2
(45) Date of Patent: Dec. 8, 2020

(54) APPARATUS AND METHOD FOR PROCESSING HEADER COMPRESSED PACKET IN ELECTRONIC DEVICE

(71) Applicant: Samsung Electronics Co., Ltd., Suwon-si (KR)

(72) Inventors: Kamma Ganesh Babu, Suwon-si (KR); Praveen Chebolu, Suwon-si (KR); Jai-Dong Kim, Yongin-si (KR); Hyeun-Mok Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/378,039

(22) Filed: Apr. 8, 2019

(65) Prior Publication Data

US 2019/0238664 A1    Aug. 1, 2019

Related U.S. Application Data

(63) Continuation of application No. 14/553,267, filed on Nov. 25, 2014, now Pat. No. 10,257,323.

(30) Foreign Application Priority Data

Nov. 25, 2013    (IN) ............................. 1331/KOL/2013
Jan. 3, 2014    (KR) ........................ 10-2014-0000763

(51) Int. Cl.
*H04L 29/02*    (2006.01)
*H04W 28/06*    (2009.01)
(Continued)

(52) U.S. Cl.
CPC ............ *H04L 69/22* (2013.01); *H04L 65/607* (2013.01); *H04L 69/04* (2013.01); *H04L 69/16* (2013.01); *H04M 7/006* (2013.01)

(58) Field of Classification Search
CPC ....... H04L 69/22; H04L 65/607; H04L 69/04; H04L 12/4633; H04L 69/16;
(Continued)

(56) References Cited

U.S. PATENT DOCUMENTS

| | | |
|---|---|---|
| 7,242,685 B1 | 7/2007 | Rash et al. |
| 7,257,374 B1 | 8/2007 | Creigh |

(Continued)

FOREIGN PATENT DOCUMENTS

| | | |
|---|---|---|
| CN | 101326502 A | 12/2008 |
| CN | 101416444 A | 4/2009 |

(Continued)

OTHER PUBLICATIONS

Chinese Office Action dated Sep. 30, 2018, issued in Chinese Application No. 201480064121.0.

(Continued)

*Primary Examiner* — Edan Orgad
*Assistant Examiner* — Vanneilian Lalchinthang
(74) *Attorney, Agent, or Firm* — Jefferson IP Law, LLP

(57) ABSTRACT

An electronic device process data including a compressed header is provided. The electronic device includes a controller configured to generate a data packet comprising a header compressed based on at least one data packet previously transmitted, and a transmitter configured to transmit the data packet.

16 Claims, 14 Drawing Sheets

(51) Int. Cl.
  *H04J 3/18* (2006.01)
  *H04L 29/06* (2006.01)
  *H04M 7/00* (2006.01)
(58) Field of Classification Search
  CPC .. H04L 65/608; H04L 65/4076; H04M 7/006; H04W 36/0055; H04W 28/06; H04W 36/14; H04W 28/065; Y02D 30/00
  USPC .......................................................... 370/392
  See application file for complete search history.

(56) References Cited

U.S. PATENT DOCUMENTS

| | | | |
|---|---|---|---|
| 7,453,907 | B2 | 11/2008 | Jonsson et al. |
| 2003/0097476 | A1 | 5/2003 | Saxena et al. |
| 2004/0151133 | A1* | 8/2004 | Yi .................. H04W 99/00 370/312 |
| 2004/0264433 | A1* | 12/2004 | Melpignano ............ H04L 29/06 370/349 |
| 2006/0104278 | A1* | 5/2006 | Chang .................... H04L 47/10 370/392 |
| 2007/0098016 | A1* | 5/2007 | Kapoor .................. H04L 69/04 370/474 |
| 2007/0211724 | A1* | 9/2007 | Johansson ............... H04L 49/00 370/392 |
| 2008/0008175 | A1* | 1/2008 | Park ....................... H04H 20/30 370/390 |
| 2008/0013546 | A1* | 1/2008 | Bhatt ...................... H04L 12/14 370/395.52 |
| 2008/0031253 | A1 | 2/2008 | Kim et al. |
| 2009/0034528 | A1* | 2/2009 | Park ........................ H04L 69/04 370/392 |
| 2009/0109924 | A1* | 4/2009 | Sato .................. H04W 36/0055 370/331 |
| 2009/0147804 | A1 | 6/2009 | Wang et al. |
| 2009/0238128 | A1 | 9/2009 | Park et al. |
| 2010/0027566 | A1* | 2/2010 | Kim ....................... H04L 65/607 370/477 |
| 2010/0039942 | A1 | 2/2010 | Nakatsuji et al. |
| 2010/0142560 | A1 | 6/2010 | Sharivker et al. |
| 2010/0202458 | A1 | 8/2010 | Sato |
| 2010/0232455 | A1* | 9/2010 | Watanabe ............ H04W 28/06 370/477 |
| 2011/0058530 | A1* | 3/2011 | Kim .................. H04W 36/0055 370/331 |
| 2011/0122893 | A1 | 5/2011 | Kang et al. |
| 2014/0185438 | A1* | 7/2014 | Patel ..................... H04W 28/06 370/230 |
| 2015/0124699 | A1 | 5/2015 | Chebolu et al. |
| 2015/0257037 | A1* | 9/2015 | Chebolu ............ H04L 65/1089 370/329 |

FOREIGN PATENT DOCUMENTS

| | | |
|---|---|---|
| CN | 101843054 A | 9/2010 |
| CN | 105706422 A | 6/2016 |
| WO | 2015/068914 A1 | 5/2015 |

OTHER PUBLICATIONS

European Office Action dated Oct. 25, 2018, issued in European Application No. 14863737A.
Korean Office Action dated Feb. 13, 2020, issued in Korean Application No. 10-2014-0000763.

* cited by examiner

APPARATUS AND METHOD FOR PROCESSING HEADER COMPRESSED PACKET IN ELECTRONIC DEVICE

CROSS-REFERENCE TO RELATED APPLICATION(S)

This application is a continuation application of prior application Ser. No. 14/553,267 filed on Nov. 25, 2014, and was based on and claimed priority under 35 U.S.C. § 119(a) of an Indian patent application filed on Nov. 25, 2013 in the Indian Intellectual Property Office and assigned Serial number 1331/KOL/2013 and a Korean patent application filed on Jan. 3, 2014 in the Korean Intellectual Property Office and assigned Serial number 10-2014-0000763, the entire disclosures of each of which is hereby incorporated by reference.

TECHNICAL FIELD

The present disclosure relates to an electronic device for processing a header compressed packet.

BACKGROUND

Robust Header Compression (ROHC) compresses a header of a packet delivered over a communication network. The ROHC can compress an Internet Protocol (IP) header, a User Datagram Protocol (UDP) header, a Real Time Protocol (RTP) header, a Transmission Control Protocol (TCP) header, and the like. In contrast to a conventional compression method, the ROHC scheme exhibits high performance in radio links.

An electronic device such as smart phone can compress a header of data transmitted, using the ROHC. For example, the electronic device can apply the ROHC to an audio packet for a Voice over IP (VoIP) call. In this case, the electronic device can reduce an amount of the transmitted data by compressing the IP/UDP header of the audio packet.

Typically, according to a VoIP call mechanism, protocol header values such as IP header do not change during the VoIP call. However, when the ROHC is enabled, the electronic device validates all of the headers though fields in the header do not change during the call.

Hence, a method for avoiding unnecessary processing in the service, such as VoIP call, where the header value does not change, is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for processing a header compressed packet in an electronic device.

Another aspect of the present disclosure is to provide an apparatus and a method for reducing power consumed by header compression and decompression in an electronic device.

Another aspect of the present disclosure is to provide an apparatus and a method for skipping part of an operation required to compress a header in an electronic device.

Another aspect of the present disclosure is to provide an apparatus and a method for skipping part of an operation required to decompress a header in an electronic device.

In accordance with an aspect of the present disclosure, an electronic device is provided. The electronic device includes a controller configured to generate a data packet comprising a header compressed based on at least one data packet previously transmitted, and a transmitter configured to transmit the data packet.

In accordance with an aspect of the present disclosure, an electronic device is provided. The electronic device includes a receiver configured to receive a data packet comprising a compressed header, and a controller configured to process data of the data packet without restoring a complete header corresponding to the compressed header.

In accordance with an aspect of the present disclosure, a method for operating an electronic device is provided. The method includes generating a data packet comprising a header compressed based on at least one data packet previously transmitted, and transmitting the data packet.

In accordance with an aspect of the present disclosure, a method for operating an electronic device is provided. The method includes receiving a data packet comprising a compressed header, and processing data of the data packet without restoring a complete header corresponding to the compressed header.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide a technique for compressing and decompressing a header in an electronic device. Hereinafter, terms are chosen to facilitate the understanding. Accordingly, the present disclosure is not limited to those terms and adopts other terms indicating equivalent subjects.

Voice over Internet Protocol (VoIP) supports real-time voice traffic in an IP network. The VoIP is based on a Multimedia Telephony (MMTel) service, and the MMTel is a VoIP service standard based on IP Multimedia Subsystem (IMS) designed to replace Circuit Switching (CS) voice. The VoIP call is processed as shown in FIG. 1.

Figure 1:
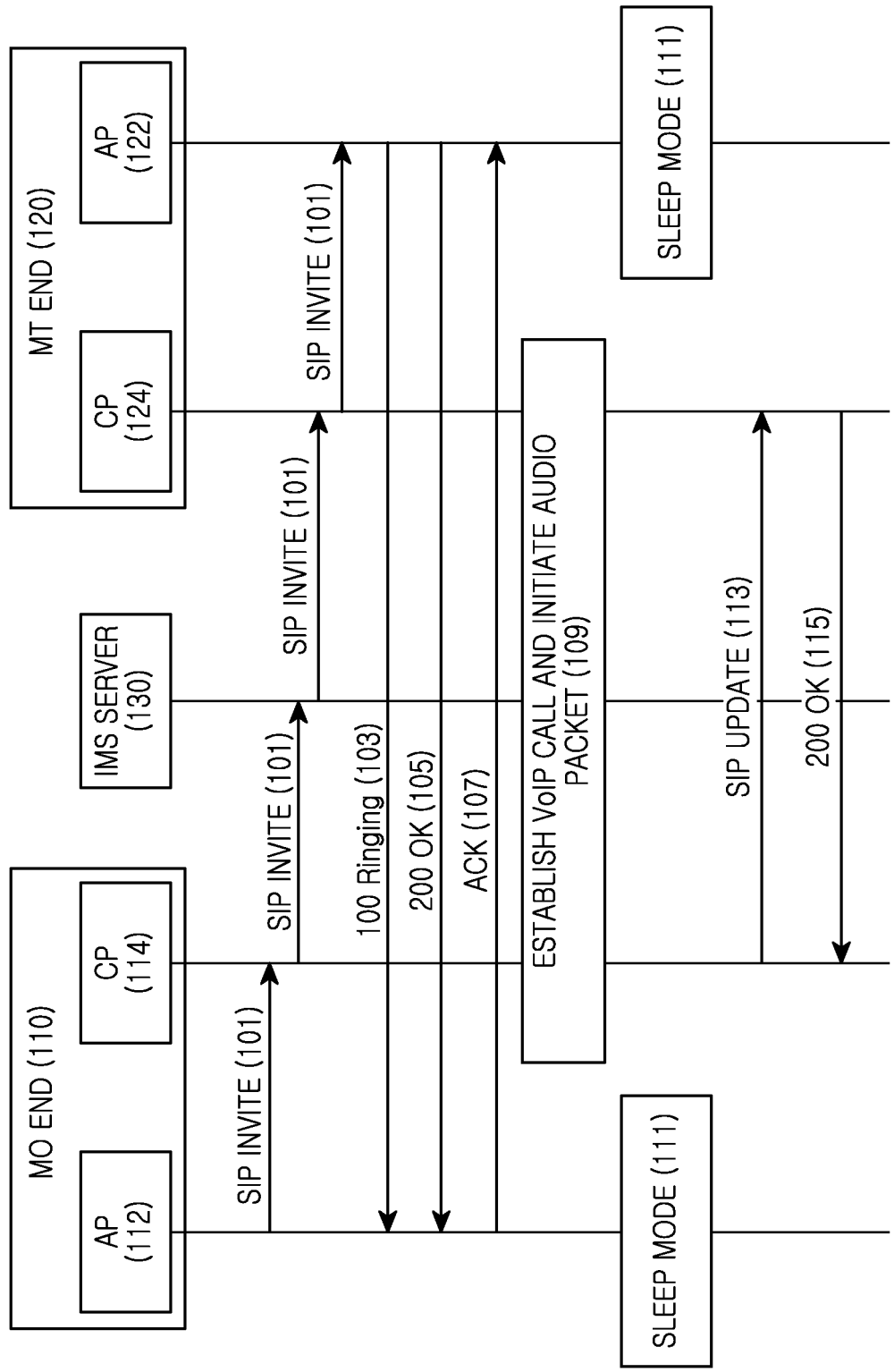
FIG. 1 illustrates a call processing method of an electronic device according to an embodiment of the present disclosure.

FIG. 1 illustrates a call processing method of an electronic device according to an embodiment of the present disclosure.

Referring to FIG. 1 depicts VoIP call connection between a Mobile Originating (MO) end 110 and a Mobile Terminating (MT) end 120.

As illustrated in FIG. 1, when a user initiates a call, the MO end 110 and the MT end 120 perform INVITE in operation 101. For example, the MO end 110 sends an INVITE message of Session Initiation Protocol (SIP) to request session establishment. More specifically, an Application Processor (AP) 112 of the MO end 110 provides the INVITE message to a Communication Processor (CP) 114, and the CP 114 sends the INVITE message to an IMS server 130. The IMS server 130 sends the INVITE message to the MT end 120. A CP 124 of the MT end 120, after receiving the INVITE message, sends the INVITE message to an AP 122. Hence, an application layer of the MT end 120 can recognize the incoming VoIP call. During the INVITE message delivery, the MO end 110 and the MT end 120 can share media capability information such as Real-Time Transport Protocol (RTP), payload types, and supported data throughput of the MO end 110 and the MT end 120.

In operation 103, the MT end 120 sends a 100 Ringing message. For example, the MT end 120 notifies the MO end 110 that the MT end 120 receives the INVITE message and informs the user of the incoming call. Similar to the INVITE message, the 100 Ringing message can be sent to the MO end 110 via the IMS server 130.

In operation 105, the MT end 120 sends a 200 OK message. For example, the MT end 120 notifies that the user receives the call. Similar to the INVITE message, the 200 OK message can be sent to the MO end 110 via the IMS server 130. For example, the 200 OK message can include information of call-Identifier (ID), content type, and content length.

In operation 107, the MO end 110 sends an ACK message. For example, the MO end 110 notifies that the MO end 110 confirms the response of the MT end 120. Similar to the INVITE message, the ACK message can be sent to the MO end 110 via the IMS server 130. Thus, the VoIP call is connected between the MO end 110 and the MT end 120.

In operation 109, the MO end 110 and the MT end 120 establish the VoIP call and initiates audio packet transmission and reception. For example, when the session establishment is successfully completed once, the MO end 110 and the MT end 120 can begin the transmission and reception of audio packets. For example, the MO end 110 and the MT end 120 can send and receive audio data using Real Time Protocol (RTP) packets. The audio packets can be processed by the CP 114 of the MO end 110 and the CP 124 of the MT end 120.

In operation 111, the AP 112 of the MO end 110 and the AP 122 of the MT end 120 enter a sleep mode. Because the audio packets are processed by the CP 114 of the MO end 110 and the CP 124 of the MT end 120, the APs 112 and 122 can enter the sleep mode to save the power. Alternatively, the APs 112 and 122 can stay active. Alternatively, the APs 112 and 122 can stay active for an operation other than the VoIP call processing.

In operation 113, the MO end 110 sends an UPDATE message to the MT end 120 to update session parameters. The UPDATE message changes the session parameters in the existing session without generating a separate session. For example, the UPDATE message can include the information of the call-ID, the content type, and the content length.

In operation 115, the MT end 120 sends a 200 OK message to notify the message reception. The 200 OK message can be sent to the MO end 110 via the IMS server 130. For example, the 200 OK message can include the information of the call-ID, the content type, and the content length.

Figure 2:
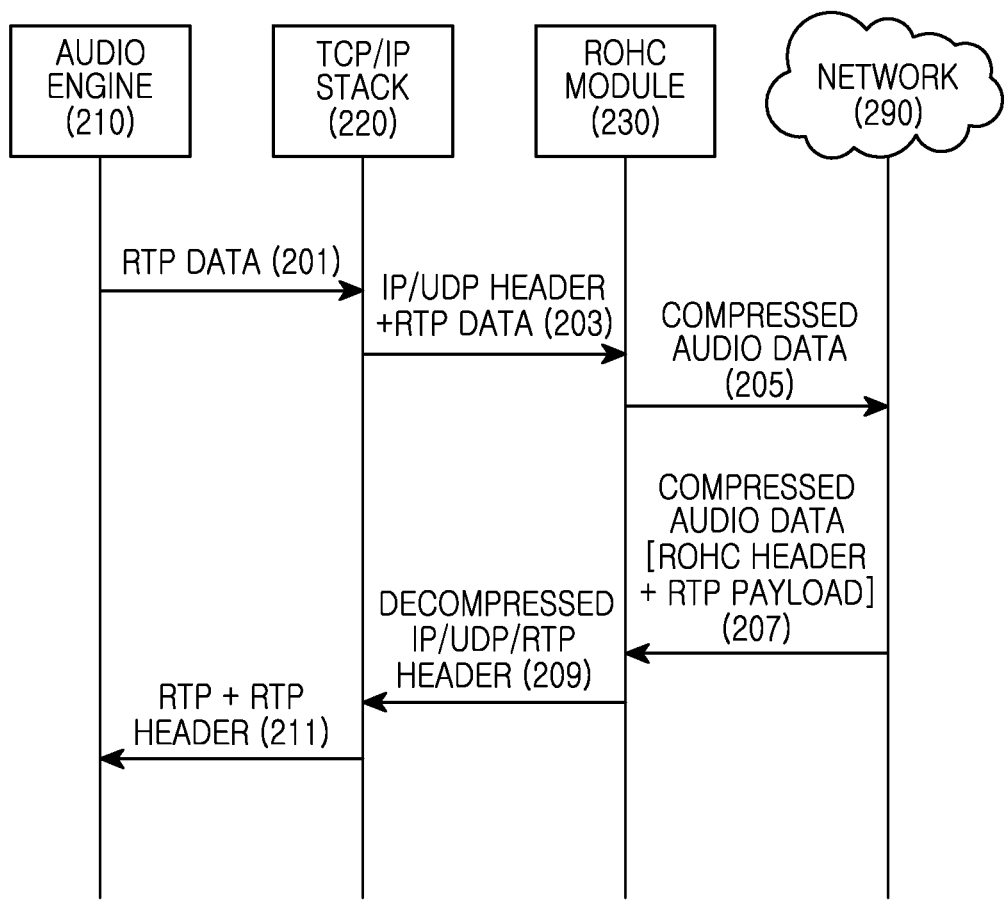
FIG. 2 illustrates audio data processing in an electronic device according to an embodiment of the present disclosure.

When the VoIP call is established according to the above call processing, the audio data can be processed in the CP as shown in FIG. 2.

FIG. 2 illustrates audio data processing in an electronic device according to an embodiment of the present disclosure.

Referring to FIG. 2, an audio engine 210, a Transmission Control Protocol (TCP)/IP stack 220, and a Robust Header Compressor (ROHC) module 230 are functional entities of the CP.

As illustrated in FIG. 2, in operation 201, the audio engine 210 generates and provides an RTP packet including audio data to the TCP/IP 220. For example, the audio engine 210 provides the audio data to the TCP/IP stack 220 to send the audio data over a network. For example, the audio engine 210 provides the audio data to the entity which processes the data transmission.

In operation 203, the TCP/IP stack 220 generates an IP/User Datagram Protocol (UDP) header, and provides the IP/UDP header and the RTP data to the ROHC module 230. For example, the TCP/IP stack 220 provides the headers to the ROHC module 230 for the data compression.

In operation 205, the ROHC module 230 compresses the header and then transmits the audio data including the compressed header to the network 290. For transmission of the audio data to the network 290, the ROHC module 230 decodes and compresses the headers. For example, at least one of an IP header, a UDP header, and an RTP header can be compressed.

In operation 207, the ROHC module 230 receives compressed audio data from the network 290. The compressed audio data can include the ROHC header and a RTP payload. For example, the ROHC header can include the compressed data of at least one of the IP header, the UDP header, and the RTP header.

In operation 209, the ROHC module 230 constructs the complete IP header, UDP header, and RTP header by decompressing the ROHD header. The ROHC module 230 provides the TCP/IP stack 220 with the audio data including the IP header, the UDP header, and the RTP header. For example, the ROHC module 230 restores the IP header, the UDP header, and the RTP header, and then provides the audio data including the restored headers to the TCP/IP stack 220 to process the IP header and the UDP header.

In operation 211, the TCP/IP stack 220 performs a process in an IP/UDP layer. For example, the TCP/IP stack 220 can validate the audio data in the IP/UDP layer. The TCP/IP stack 220 provides the validated audio data to the audio engine 210. The validated audio data includes the IP header, the UDP header, the RTP header, and the RTP payload.

Figure 3:
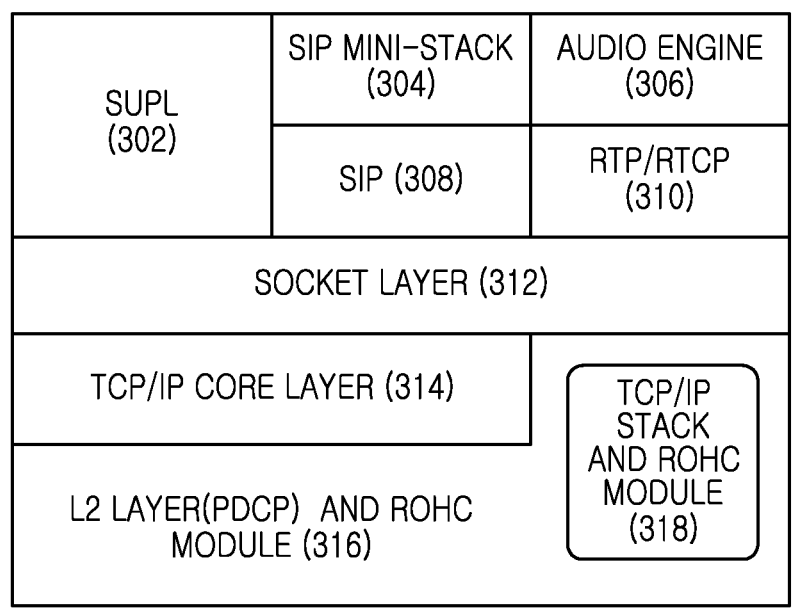
FIG. 3 illustrates a Transfer Control Protocol (TCP)/Internet Protocol (IP) stack of an electronic device according to an embodiment of the present disclosure.

Architecture of the TCP/IP stack for processing the audio data is shown in FIG. 3.

FIG. 3 depicts a TCP/IP stack of an electronic device according to an embodiment of the present disclosure.

Referring to FIG. 3, the TCP/IP stack includes a Secure User Plane Location (SUPL) 302, a SIP mini-stack 304, an audio engine 306, an SIP 308, an RTP/Real Time Transport Control Protocol (RTCP) 310, a socket layer 312, a TCP/IP core layer 314, a Layer-2 (L2) and ROHC module 316, and a TCP/IP stack and ROHC module 318.

The SUPL 302 processes a received SUPL packet. The SUPL 302, which is an IP-based protocol, assists Global Positioning System (GPS). The SUPL 302 controls the message delivery in the position determination.

The SIP mini-stack 304 handles SIP refresh. The SIP mini-stack 304 processes session refresh during a VoIP call.

The audio engine 306 generates an RTP/RTCP packet for the VoIP call. For example, the audio engine 306 can convert raw audio data to the audio data according to a preset audio codec, and convert the audio data to the raw data. For example, the audio engine 306 can compress and decompress digital audio data. For example, the audio engine 306 can use an Adaptive Multi-Rate (AMR) codec.

The SIP 308 controls signaling according to the SIP protocol. For example, the SIP 308 generates and interprets SIP messages (e.g., INVITE message, OK message, Ringing message, ACK message, UPDATE message, and/or the like).

The RTP/RTCP 310 controls the signaling for the real-time transmission and the real-time data transmission. The RTP/RTCP 310 can generate a packet for the real-time data transmission, and control to unicast or multicast the packet. The RTP/RTCP 310 can monitor Quality of Service (QoS), collect recipient information, and calculate the throughput.

The socket layer 312 processes every socket call from an application such as SUPL 302. For example, the socket layer 312 can guarantee safe information delivery. The socket layer 312 can control a negotiation procedure relating to an encryption key. The socket layer 312 can be referred to as a Secure Socket Layer (SSL).

The TCP/IP core layer 314 processes all the IP packets from the network, processes the IP/UDP header, and then provides the final payload to the corresponding application. The TCP/IP core layer 314 adds the IP/UDP header to the payload from the application and sends the payload to the lower layer. For example, the TCP/IP core layer 314 manages data flow, verifies data integrity, and sends the packet to its destination. More specifically, the TCP/IP core layer 314 can accurately deliver the data from one place to other place, and control the data flow to successfully send the whole data. The TCP/IP core layer 314 interconnects computers of different systems in the Internet, and controls the data transmission. The TCP/IP core layer 314 can control an application layer, a transport layer, an Internet layer, a network layer, and the like.

The L2 and ROHC module 316 processes the header compression according to the L2 processing and the ROHC scheme. For example, the L2 can include Packet Data Convergence Protocol (PDCP). The PDCP can perform the IP header compression and decompression, transfer of user data, and maintenance of sequence numbers of radio bearers.

The TCP/IP stack and ROHC module 318 controls the processing (e.g., IP/UDP header verification) in the TCP/IP layer and the header compression and decompression according to the ROHC scheme. In particular, the TCP/IP stack and ROHC module 318, for the lightweight function, can determine the state of a particular session and skip some function based on the state. For example, the particular session can include the VoIP session.

During the whole VoIP call flow, a data stream does not change. The stream includes a source IP address, a source port number, a remote IP address, a remote port number and a next header. When any field of the IP/UDP headers does not change throughout the call, it may be unnecessary for the TCP/IP to construct the header in both of UpLink (UL) and DownLink (DL) VoIP calls.

When the ROHC function is enabled, in the electronic device for sending the packet, the ROHC module decodes at least one of the IP header, the UDP header, and the RTP header for the ROHC compression and generates the compressed header. Likewise, when the ROHC function is enabled, in the electronic device for receiving the packet, the ROHC module constructs at least one of the IP header, the UDP header, and the RTP header from the ROHC packet and provides data including the constructed header to the TCP/IP stack. Hence, in the electronic device for receiving the packet, the TCP/IP stack decodes the headers and provides the payload to the audio engine.

Hence, for the service of the unchanging IP/UDP header value such as VoIP, according to various embodiments of the present disclosure, the electronic device excludes the unnecessary and redundant verification in the DL and UL paths such as header verification and IP/UDP header encoding/decoding. Thus, the power consumption can reduce and the battery can be saved. During the VoIP call with the ROHC enabled, the power consumption can be reduced.

Figure 4:
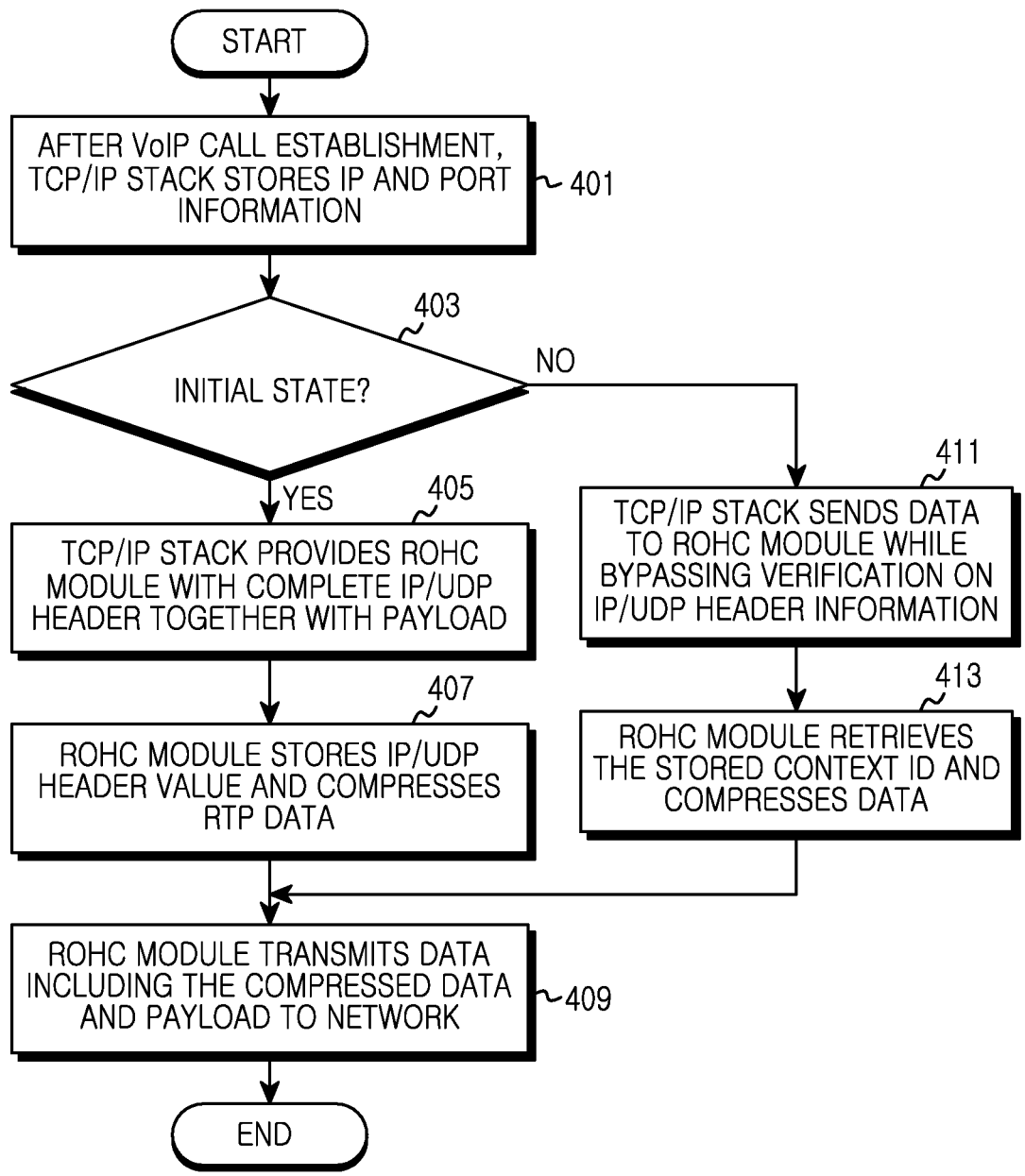
FIG. 4 illustrates a method for compressing a header for an outgoing call in an electronic device according to an embodiment of the present disclosure.

FIG. 4 illustrates a method for compressing a header of an outgoing call in an electronic device according to an embodiment of the present disclosure.

Referring to FIG. 4, in operation 401, after the VoIP call is established, the TCP/IP stack stores source and remote IP address information and port number information. For example, the TCP/IP stack stores the call related parameters.

In operation 403, the TCP/IP stack determines whether the VoIP call is in an initial state. As an example, the initial state requires the direct compression operation for the header compression and includes part of the start of the whole VoIP call process. For example, the initial state can be defined as the number of the processed audio packets. For example, the initial state can be defined as a time duration.

In the initial state, the TCP/IP stack provides the ROHC module with the complete IP/UDP header together with the payload in operation 405. For example, in the initial state, the TCP/IP stack can perform the normal operation for encoding the IP/UDP header. The payload can include the RTP packet. The RTP packet can be generated by the audio engine, and includes the RTP header and the RTP payload.

In operation 407, the ROHC module stores the IP/UDP header value and compresses the RTP data. For example, the ROHC module compresses the IP/UDP/RTP header. For example, the ROHC module can compress only part of the IP header, the UDP header, and the RTP header. For doing so, the ROHC module can decode the IP/UDP header. In so doing, the ROHC module can allocate a new context ID to the stored IP/UDP header values.

In operation 409, the ROHC module transmits the data including the compressed data with the ROHC scheme and the payload to the network. For example, the ROHC module outputs the data including the compressed data and the payload, and a signal processing module (e.g., a BaseBand (BB) module, a Radio Frequency (RF) module) converts the data to a physical signal and transmits the physical signal. The compressed data may include the compressed data of at least one of the IP header, the UDP header, and the RTP header, and the payload includes the payload of the RTP packet.

When the TCP/IP stack is not in the initial state in operation 403, the TCP/IP stack sends the data to the ROHC module while bypassing the verification on the IP/UDP header in operation 411. The data is the payload and can include the RTP packet. The RTP packet can be generated by the audio engine and includes the RTP header and the RTP payload. For example, unlike the initial state, the TCP/IP stack, which learns properties of the current VoIP call, provides the application data directly to the ROHC module. Namely, the whole or part of the TCP/IP stack functionality is skipped.

In operation 413, the ROHC module retrieves the stored context ID and compresses the data. For example, the ROHC module can compress at least one of the IP header, the UDP header, and the RTP header based on the stored VoIP properties. For example, the ROHC module can compress the data by retrieving the pre-generated compressed header using the context ID, rather than directly compressing the data as in the initial state.

In operation 409, the ROHC module transmits the data including the compressed data using the ROHC scheme and the payload to the network. For example, the ROHC module outputs the data including the compressed data and the payload, and the signal processing module (e.g., the BB module and the RF module) converts the data to the physical signal and transmits the physical signal. The compressed data may include the compressed data of at least one of the IP header, the UDP header, and the RTP header, and the payload includes the payload of the RTP packet.

Figure 5:
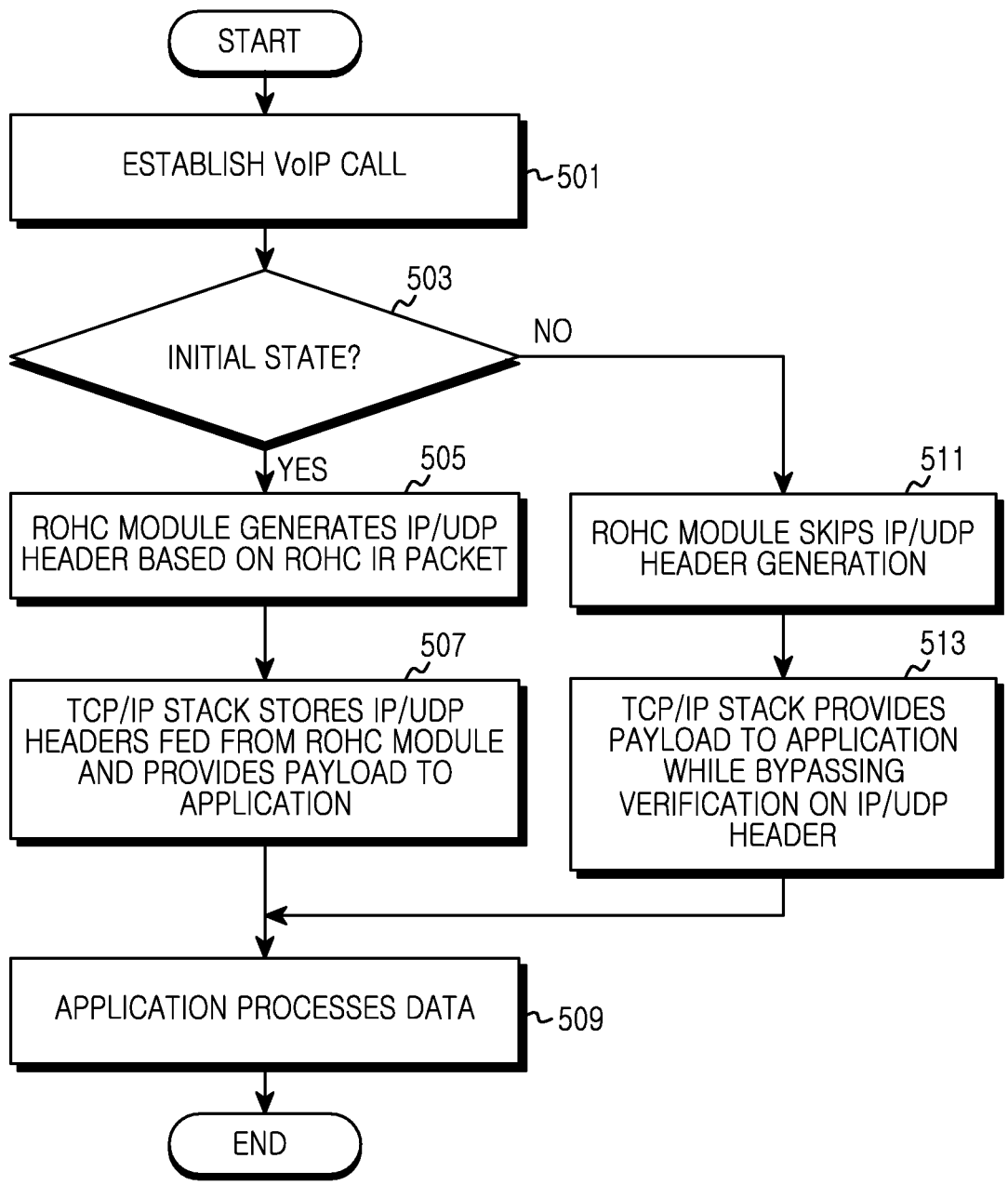
FIG. 5 illustrates a method for decompressing a header for an incoming call in an electronic device according to an embodiment of the present disclosure.

FIG. 5 illustrates a method for decompressing a header of an incoming call in an electronic device according to an embodiment of the present disclosure.

Referring to FIG. 5, the VoIP call is established in operation 501. The VoIP call setup can include session establishment of the higher layer and bearer establishment of a radio access network. The session establishment can be performed by the SIP, and the bearer establishment can be performed by Radio Resource Control (RRC) layer protocol.

In operation 503, the TCP/IP stack determines whether the VoIP call is in the initial state. As an example, the initial state requires the direct decompression operation for the header compression and includes part of the start of the whole VoIP call process. For example, the initial state can be defined as the number of the processed audio packets. For example, the initial state can be defined as the time duration.

In the initial state, the ROHC module constructs the IP/UDP header based on an Initialization and Refresh (IR) packet provided from the other electronic device in operation 505. The IR packet delivers static field information of the header information, can include a profile index, and is provided at the early stage of the ROHC procedure. The profile index can indicate the range of the header to compress. For example, the static field information can include the IP address, the port number, protocol information, and the like. For example, the ROHC module restores the IP/UDP header using the information of the IR packet previously received.

In operation 507, the TCP/IP stack stores the IP/UDP headers fed from the ROHC module and then provides the payload to the application. In so doing, the TCP/IP stack can verify the IP header and the UDP header. The verification can include error detection.

In operation 509, the application processes the audio data. For example, the application restores the raw audio data according to the codec applied to the audio data. Hence, the electronic device can output the audio through an output means (e.g., a speaker).

When the VoIP call is not in the initial state in operation 503, the ROHC module skips the IP/UDP header generation in operation 511. For example, after the IP/UDP header value is stored during the initial state, the decompression of the ROHC module is skipped. For example, the IP/UDP header is not restored.

In operation 513, the TCP/IP stack provides the payload to the application while bypassing the verification of the IP/UDP header. For example, the TCP/IP stack receives the data not including the IP/UDP header from the ROHC module, and forwards the received data to the application.

The data provided to the TCP/IP stack can include or not include the compressed data. For example, when receiving the data including the compressed header from the ROHC module, the TCP/IP stack can provide the payload excluding the compressed header to the application.

In operation 509, the application processes the audio data. For example, the application restores the raw audio data according to the codec applied to the audio data. Hence, the electronic device can output the audio through the output means (e.g., the speaker).

As such, the ROHC module can directly operate with the stored IP/UDP header values. Functions for calculating a UDP checksum can be transferred from the TCP/IP stack to the ROHC module. When the UDP checksum is optional, the function relating to the whole UDP checksum can be skipped. In the IP header checksum, the changeable fields include only IP-ID and packet length. Throughout the VoIP call, most packets have the same length. Accordingly, based on a Hash mechanism, the electronic device can store the IP header checksum. When a hash key matches, the electronic device can retrieve the stored checksum.

Figure 6:
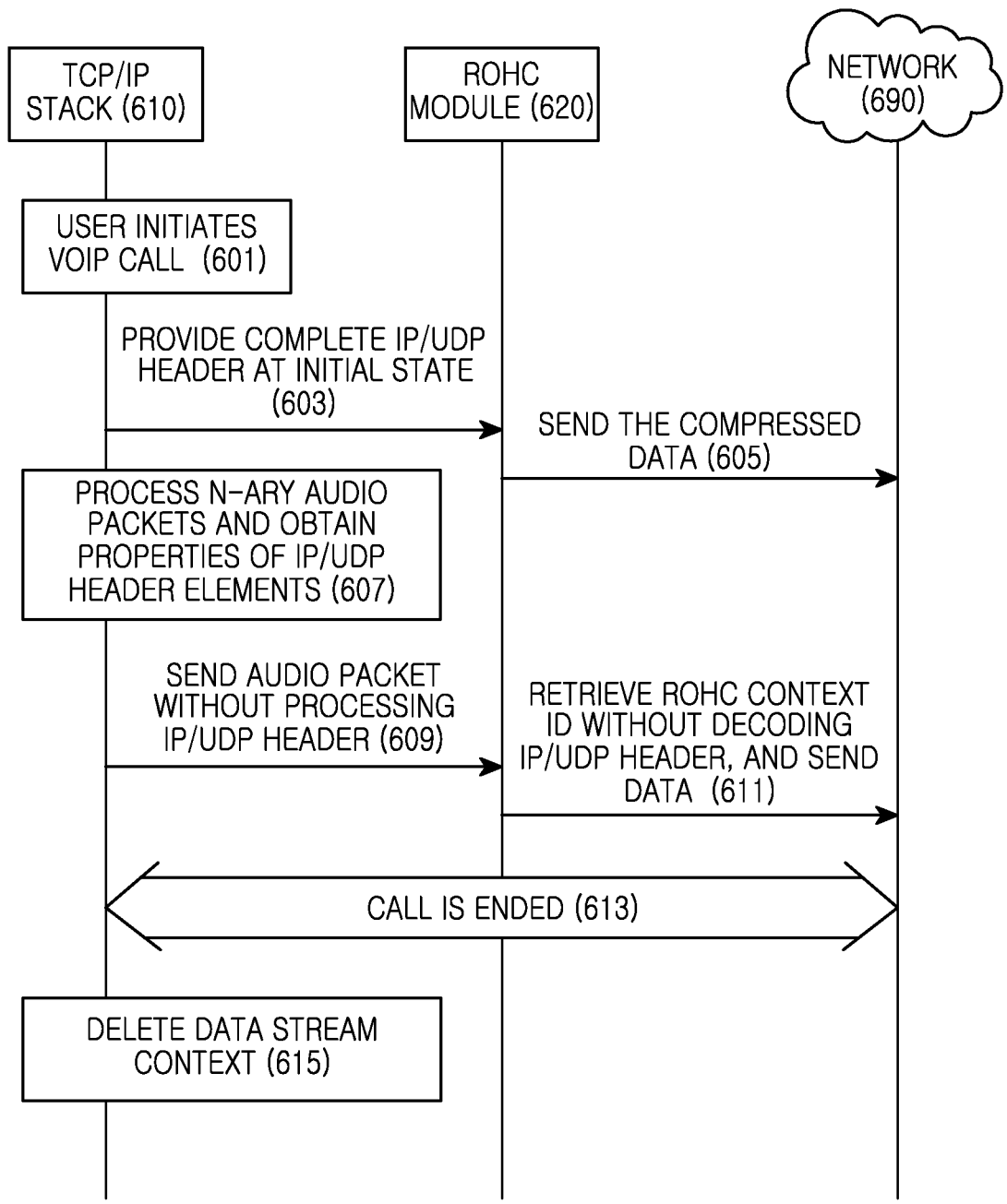
FIG. 6 illustrates signal exchange for an incoming call in an electronic device according to an embodiment of the present disclosure.

FIG. 6 illustrates signal exchange for an incoming call in an electronic device according to an embodiment of the present disclosure.

Referring to FIG. 6, the VoIP call is initiated in operation 601. The VoIP call setup can include the session establishment of the higher layer and the bearer establishment of the radio access network. The session establishment can be performed by the SIP, and the bearer establishment can be performed by the RRC layer protocol.

In operation 603, the TCP/IP stack 610 provides the data including the complete IP/UDP header at the initial state. The TCP/IP stack 610 receives the audio data, generates the IP/UDP header for the audio data, and then provides the audio data including the IP/UDP header to the ROHC module. The audio data can be generated by the audio engine, and generated as the RTP packet.

In operation 605, the ROHC module 620 compresses the header and then sends the compressed data to a network 690. For example, the ROHC module 620 can compress the header by excluding at least one of a field not changing during the session and a field estimated from other values. The ROHC module 620 can compress at least one of the IP header, the UDP header, and the RTP header.

In operation 607, the TCP/IP stack 610 processes n-ary audio packets and then obtains the properties of IP/UDP header elements. For example, the TCP/IP stack 610 obtains the necessary information for compressing the IP/UDP header. n denotes the number of packets defining the initial state. Alternatively, the initial state can be defined as the time duration, rather than the number of the packets. In this case, the TCP/IP stack 610 can obtain the properties of the IP/UDP header elements after the time defining the initial state passes.

In operation 609, the TCP/IP stack 610 forwards the audio packet without processing the IP/UDP header. For example, because the initial state is ended, the TCP/IP stack 610 does not process the IP/UDP header. For example, the TCP/IP stack 610 can forward the audio data to the ROHC module 620 without generating the IP/UDP header. In other words, the TCP/IP stack 610 can provide the RTP packet including the audio data to the ROHC module 620. Alternatively, the TCP/IP stack 610 can generate the IP/UDP header while skipping part of the processing in the initial state.

In operation 611, the ROHC module 620 retrieves the ROHC context ID without decoding the IP/UDP header, and transmits the data including the header corresponding to the context ID to the network 690. For example, the ROHC module 620 stores the compressed header corresponding to the context ID, and can retrieve the compressed header corresponding to the context ID. The compressed header corresponding to the context ID can be stored in the initial state. For example, the ROHC module 620 pre-stores the necessary fields for compressing the header. The ROHC module 620 can retrieve the stored fields corresponding to the context ID and then generate the compressed header based on the retrieved fields. Hence, the ROHC module 620 can skip whole or part of the operation for generating the compressed header and transmit the pre-stored compressed header.

In operation 613, the call is ended. The call end can include at least one of session deletion of the higher layer and bearer deletion of the radio access network. The session deletion can be performed by the SIP, and the bearer deletion can be performed by the RRC layer protocol.

In operation 615, the TCP/IP stack 610 deletes the context of the data stream. The context of the data stream indicates the necessary information for the header compression. For example, the TCP/IP stack 610 deletes the necessary information for the header compression.

Figure 7:
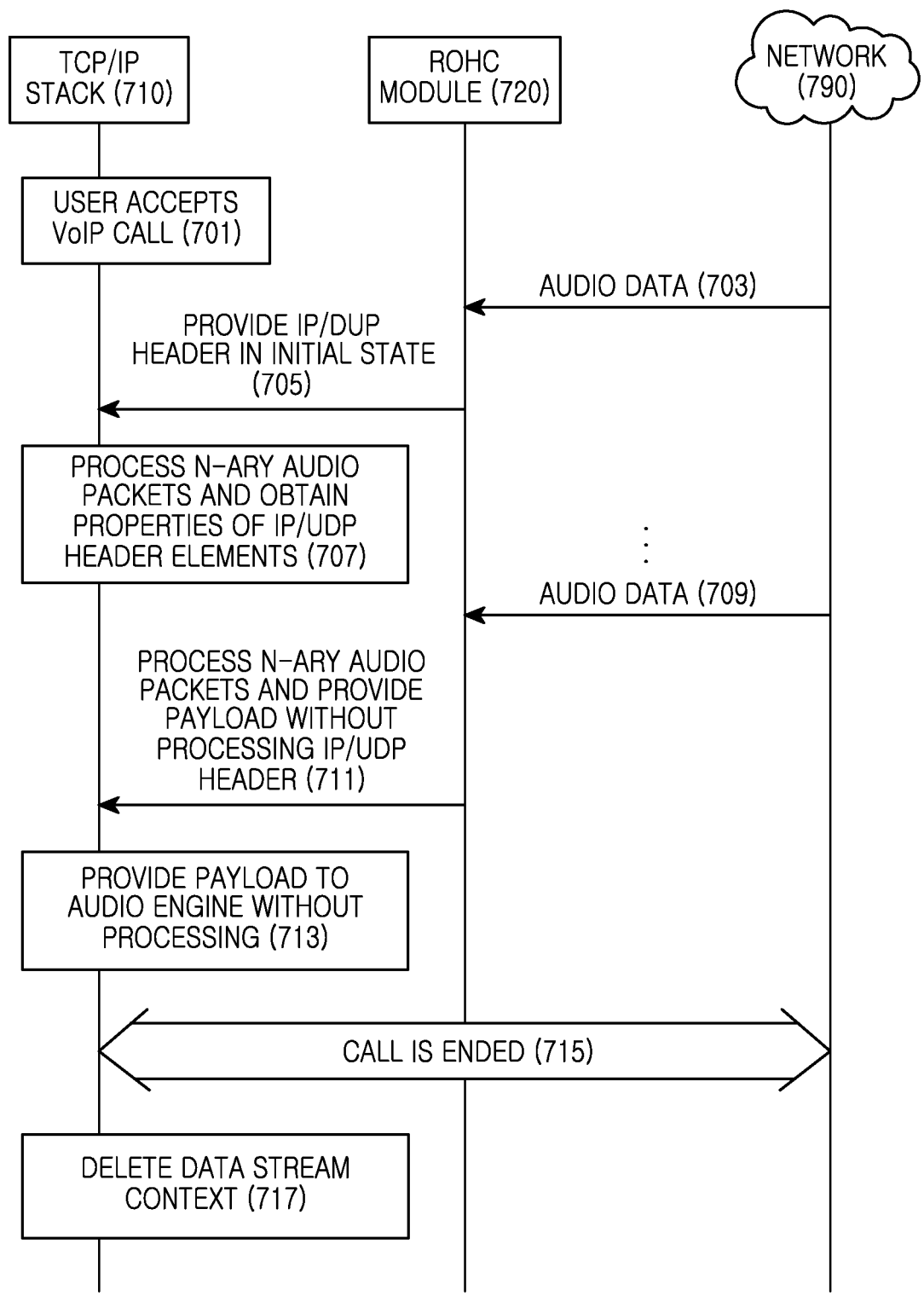
FIG. 7 illustrates signal exchange for an outgoing call in an electronic device according to an embodiment of the present disclosure.

FIG. 7 illustrates signal exchange for an outgoing call in an electronic device according to an embodiment of the present disclosure.

Referring to FIG. 7, the VoIP call is initiated in operation 701. The VoIP call setup can include the session establishment of the higher layer and the bearer establishment of the radio access network. The session establishment can be performed by the SIP, and the bearer establishment can be performed by the RRC layer protocol.

In operation 703, an ROHC module 720 receives audio data from a network 790. The audio data includes the compressed header. The compressed header can include the compressed data of at least one of the IP header, the UDP header, and the RTP header.

In operation 705, in the initial state, the ROHC module 720 constructs the IP/UDP header by decompressing the header and then provides the data including the restored IP/UDP header to a TCP/IP stack 710.

In step 707, n-ary audio packets are processed and the TCP/IP stack 710 obtains the properties of the IP/UDP header elements. For example, in the initial state, the TCP/IP stack 710 obtains the properties of the IP/UDP header elements. The properties of the IP/UDP header elements can be used to generate the context for the data stream required to decompress the header.

In operation 709, the ROHC module 720 receives the audio data from the network 790. For example, the ROHC module 720 receives the audio data after the initial state finishes. The audio data includes the compressed header. The compressed header can include the compressed data of at least one of the IP header, the UDP header, and the RTP header.

In operation 709, n-ary audio packets are processed and the ROHC module 720 provides the data without the IP/UDP header to the TCP/IP stack 710. For example, the ROHC module 720 can forward the received audio data to the TCP/IP stack 710 without generating the IP/UDP header. In so doing, the ROHC module 720 can remove the compressed header. For example, the ROHC module 720 can provide the audio data including the compressed header.

In operation 711, the TCP/IP stack 710 provides the payload to the audio engine without processing the IP/UDP header.

In operation 713, when receiving the audio data without the compressed header from the ROHC module 720, the TCP/IP stack 710 may not process the IP/UDP header. For example, when receiving the audio data including the compressed header, the TCP/IP stack 710 can remove the compressed header and then provide the payload to the audio engine.

In operation 715, the call is ended. The call end can include at least one of the session deletion of the higher layer and the bearer deletion of the radio access network. The session deletion can be performed by the SIP, and the bearer deletion can be performed by the RRC layer protocol.

In operation 717, the TCP/IP stack 710 deletes the context of the data stream. The context of the data stream indicates the necessary information for the header decompression. For example, the TCP/IP stack 710 deletes the necessary information for the header compression.

Figure 8:
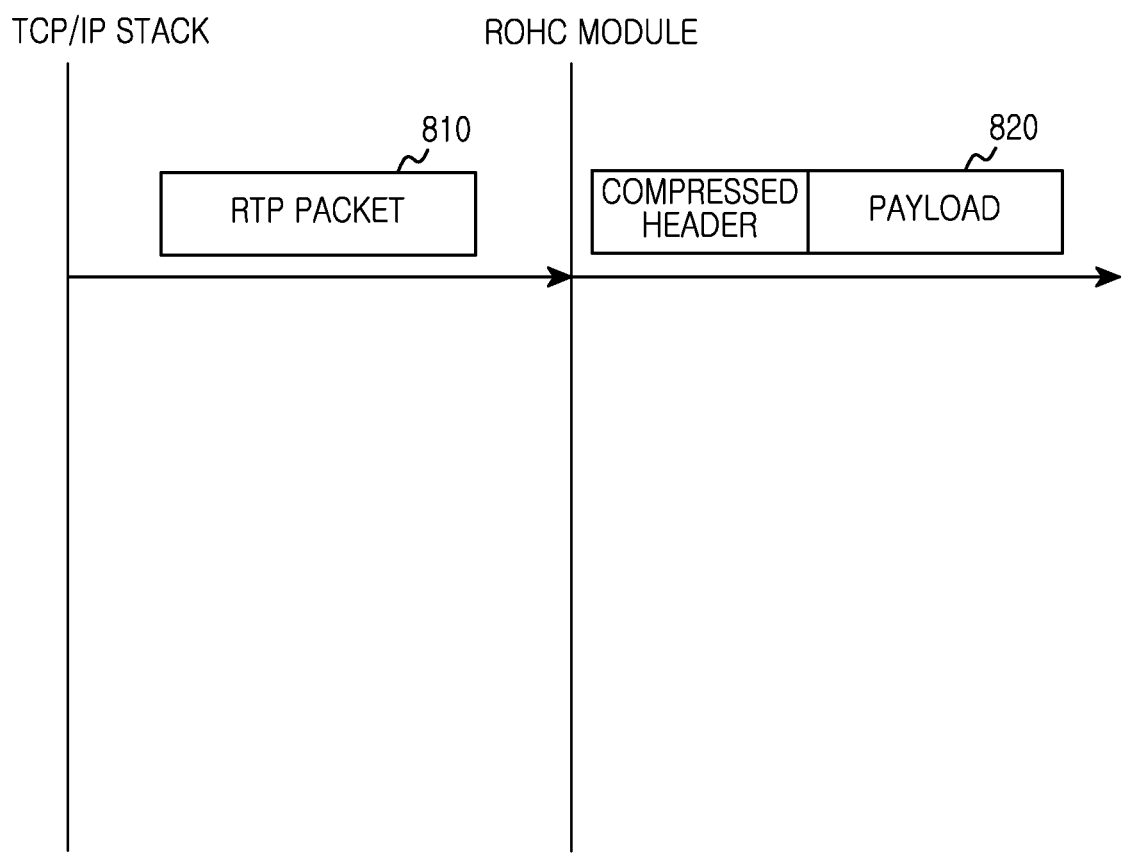
FIG. 8 illustrates a method for processing audio data transmitted in an electronic device according to an embodiment of the present disclosure.

FIG. 8 illustrates a method for processing audio data transmitted in an electronic device according to an embodiment of the present disclosure.

Referring to FIG. 8, the audio data after the initial state is depicted. As illustrated in FIG. 8, audio data 810 provided from the TCP/IP stack to the ROHC module includes only the RTP packet. For example, the TCP/IP stack may not generate the IP/UDP header. Next, audio data 820 output from the ROHC module includes the compressed header. The compressed header can include at least one of the IP header, the UDP header, and the RTP header.

Figure 9:
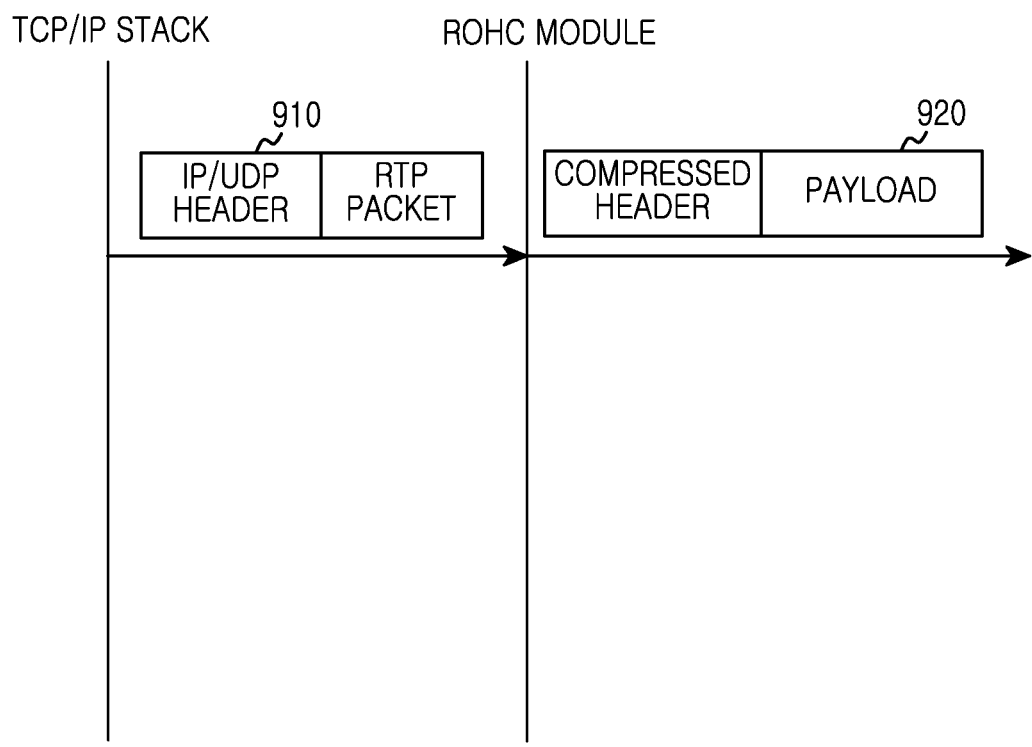
FIG. 9 illustrates a method for processing audio data transmitted in an electronic device according to an embodiment of the present disclosure.

FIG. 9 illustrates a method for processing audio data transmitted in an electronic device according to an embodiment of the present disclosure.

Referring to FIG. 9, the audio data after the initial state is depicted. As illustrated in FIG. 9, audio data 910 provided from the TCP/IP stack to the ROHC module includes the RTP packet and the IP/UDP header. For example, the TCP/IP stack generates the IP/UDP header. However, part (e.g., the verification and the checksum) of the processing on the IP/UDP header can be skipped in the initial state. Next, audio data 920 output from the ROHC module can include the compressed header. The compressed header can include the compressed data of at least one of the IP header, the UDP header, and the RTP header.

Figure 10:
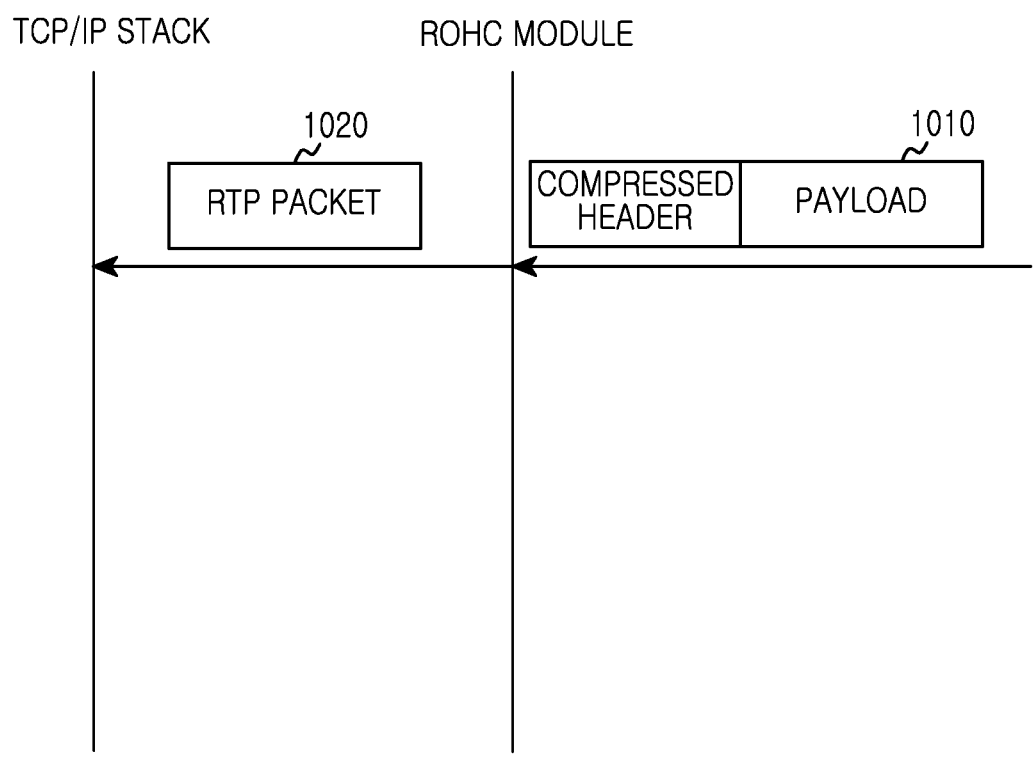
FIG. 10 illustrates a method for processing audio data received in an electronic device according to an embodiment of the present disclosure.

FIG. 10 illustrates a method for processing audio data received in an electronic device according to an embodiment of the present disclosure.

Referring to FIG. 10, the audio data after the initial state is depicted. As illustrated in FIG. 10, audio data 1010 received at the ROHC module includes the compressed header and the data. The compressed header can include the compressed data of at least one of the IP header, the UDP header, and the RTP header. Next, audio data 1020 provided from the ROHC module to the TCP/IP stack includes only the RTP packet. For example, the ROHC module removes the compressed header and then provides the RTP packet. When the compressed header includes the data of the compressed RTP header, the ROHC module can restore the RTP packet by decompressing the RTP header.

Figure 11:
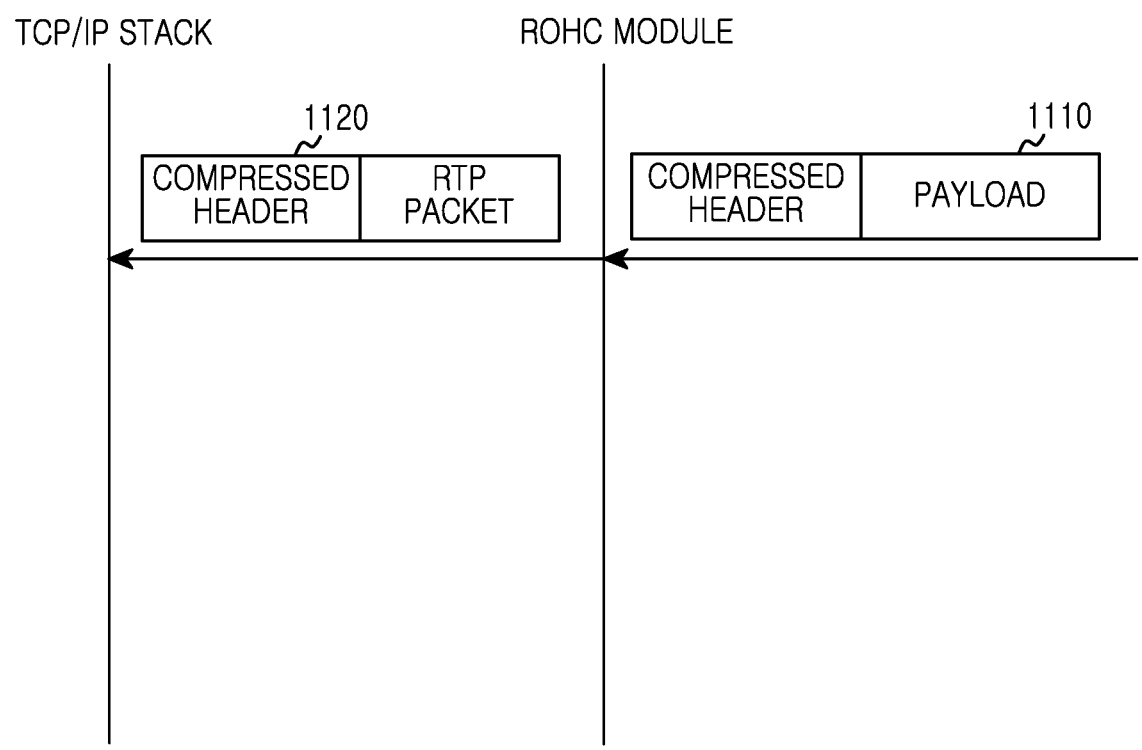
FIG. 11 illustrates method for processing audio data received in an electronic device according to an embodiment of the present disclosure.

FIG. 11 illustrates a method for processing a received audio data in an electronic device according to an embodiment of the present disclosure.

Referring to FIG. 11, the audio data after the initial state is depicted. As illustrated in FIG. 11, audio data 1110 received at the ROHC module includes the compressed header and the data. The compressed header can include the compressed data of at least one of the IP header, the UDP header, and the RTP header. Next, audio data 1120 provided from the ROHC module to the TCP/IP stack includes the RTP packet and the compressed IP/UDP header. For example, the ROHC module provides the audio data without removing the compressed header. In this case, the TCP/IP stack can remove the compressed IP/UDP header.

Figure 12:
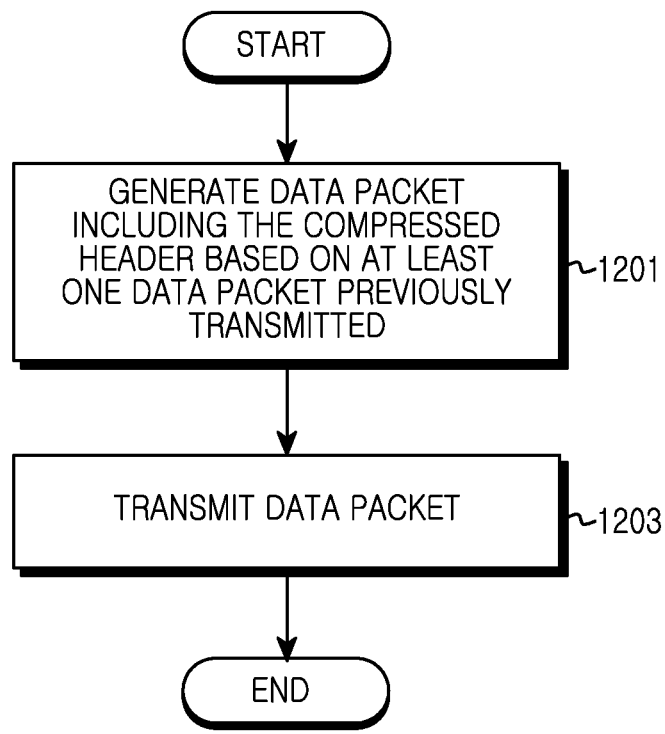
FIG. 12 illustrates operations of an electronic device according to an embodiment of the present disclosure.

FIG. 12 illustrates operations of an electronic device according to an embodiment of the present disclosure.

Referring to FIG. 12, the electronic device generates the data packet including the compressed header based on at least one data packet previously transmitted in operation 1201. For example, the electronic device generates the compressed header based on the information obtained from the at least one data packet previously transmitted, rather than the complete IP/UDP header for the current data transmitted. For example, the electronic device can generate the header compressed data excluding whole or part of the IP/UDP header related operation. More specifically, the electronic device can retrieve and attach the pre-stored compressed header to the payload, without generating the IP/UDP header. For example, the electronic device generates the IP/UDP header. For doing so, the electronic device can retrieve and attach the pre-stored compressed header to the payload without decoding the IP/UDP header to generate the compressed header. For example, without generating the IP/UDP header, the electronic device can retrieve the necessary fields to compress the pre-stored header, generate the compressed header based on the retrieved fields, and attach the compressed header to the payload.

In operation 1203, the electronic device transmits the data packet. The data includes the compressed header and the payload. For example, the compressed header can include the compressed data of at least one of the IP header, the UDP header, and the RTP header. The payload can include the payload of the RTP packet.

The method of FIG. 12 can be performed when the IP/UDP header values do not change during the session. For example, the method of FIG. 12 can be performed in the session for the VoIP call. In this case, the data packet generated and transmitted by the electronic device can include the audio data including the voice.

The method of FIG. 12 can be performed after the initial state of the session. For example, the electronic device can store the necessary data (e.g., the compressed header, the necessary field for the header compression) to generate the compressed header in the initial state. For example, the initial state can be defined as the number of the processed packets. In this case, the electronic device can transmit n-ary packets of the predefined number and then conduct the method of FIG. 12. For example, the initial state can be defined as the time duration. In this case, when the predefined time passes after the session establishment, the electronic device can perform the method of FIG. 12.

Figure 13:
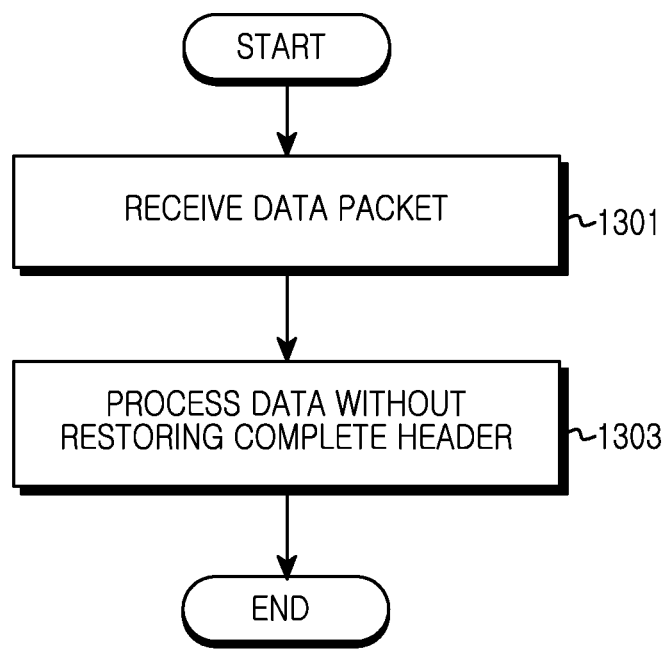
FIG. 13 illustrates operations of an electronic device according to an embodiment of the present disclosure.

FIG. 13 illustrates operations of an electronic device according to an embodiment of the present disclosure.

Referring to FIG. 13, the electronic device receives the data packet in operation 1301. The data packet includes the compressed header and the payload. For example, the compressed header can include the compressed data of at least one of the IP header, the UDP header, and the RTP header. The payload can include the payload of the RTP packet.

In operation 1303, the electronic device processes the data without restoring the complete header. For example, the electronic device can process the data without generating the IP/UDP header. The conventional method, when receiving the data including the compressed header, restores the complete IP/UDP header from the compressed header. By contrast, the electronic device removes the compressed header and processes the payload of the data packet in the corresponding higher layer without restoring the complete IP/UDP header. However, when the header required to process the data in the higher layer is compressed together, the electronic device can restore the header required to process the data in the higher layer. In so doing, the compressed header can be removed by the ROHC module or the TCP/IP stack.

The method of FIG. 13 can be performed when the IP/UDP header values do not change during the session. For example, the method of FIG. 13 can be performed in the session for the VoIP call. In this case, the data packet generated and transmitted by the electronic device can include the audio data including the voice.

The method of FIG. 13 can be performed after the initial state of the session. For example, the initial state can be defined as the number of the processed packets. In this case, the electronic device can receive n-ary packets of the predefined number and then conduct the method of FIG. 13. For example, the initial state can be defined as the time duration. In this case, when the predefined time passes after the session establishment, the electronic device can perform the method of FIG. 13.

Figure 14:
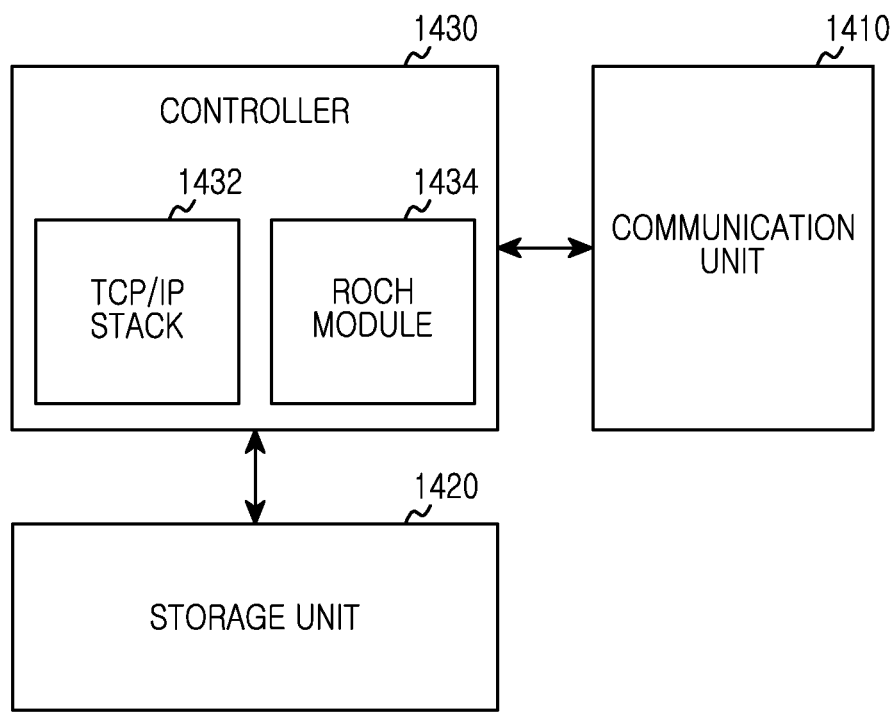
FIG. 14 illustrates an electronic device according to an embodiment of the present disclosure.

FIG. 14 is a block diagram of an electronic device according to an embodiment of the present disclosure.

Referring to FIG. 14, the electronic device includes a communication unit 1410, a storage unit 1420, and a controller 1430.

The communication unit 1410 provides an interface for communicating with the other entities. The communication unit 1410 can provide an interface for the wireless communication or the wired communication. For doing so, the communication unit 1410 can perform conversion between a physical signal and a bitstring according to a physical layer standard of the system. For the interface for the wireless communication, the communication unit 1410 can include an RF module and at least one antenna for signal band conversion and amplification, and signal transmission and reception over a radio channel. In this case, the communication unit 1410 can include a transmit filter, a receive filter, an amplifier, a mixer, an oscillator, a Digital to Analog Converter (DAC), an Analog to Digital Converter (ADC), and the like. The communication unit 1410 can be referred to as a transmitter, a receiver, or a transceiver.

The storage unit 1420 stores a basic program for the operations of the electronic device, the application, and data such as setup information. In particular, the storage unit 1420 can store an application for a communication service, and setup information of the communication service. Further, the storage unit 1420 can store communication history of a communication session. For example, the communication history can include messages and files transceived in the communication session, and communication participant information (e.g., name and contacts). The storage unit 1420 provides the stored data according to a request of the controller 1430.

An input and output unit (not shown) provides an interface for interacting with the user. For example, for the input, the input and output unit can include at least one key, at least one sensor, at least one camera module, and at least one microphone. For the output, the input and output unit can include at least one visual display means and an audio output means. For example, the visual display means can include at least one of a Liquid Crystal Display (LCD), a Light Emitting Diode (LED), a Light emitting Polymer Display (LPD), an Organic LED (OLED), an Active Matrix OLED (AMOLED), and a Flexible LED (FLED). The audio output means can include the speaker. The input and output unit can include a touch screen. Although the input and output unit may be a single module, the input and output unit can be divided into an input unit for the input and an output unit for the output.

The controller 1430 controls the operations of the electronic device. For example, the controller 1430 transmits and receives the signals through the communication unit 1410. The controller 1430 records and reads the data to and from the storage unit 1420. The controller 1430 can analyze a user's command or a physical signal (e.g., heat, light, and sound) input through the input and output unit, and processes the corresponding operation. For doing so, the controller 1430 can include at least one processor. The controller 1430 can include a TCP/IP stack 1432 for sending and receiving the audio data using the VoIP call, and an ROHC module 1434 for compressing the header. For example, the controller 1430 can control the electronic device to operate as shown in FIG. 12 or FIG. 13. The controller 1430 operates as follows.

When the electronic device transmits the data, the controller 1430 generates the header compressed data by excluding whole or part of the IP/UDP header related operation. For example, the controller 1430 can retrieve and attach the pre-stored compressed header to the payload, without generating the IP/UDP header. For example, the controller 1430 generates the IP/UDP header. For doing so, the controller 1430 can retrieve and attach the pre-stored compressed header to the payload without decoding the IP/UDP header. For example, without generating the IP/UDP header, the controller 1430 can retrieve the necessary fields for compressing the pre-stored header, generate the compressed header based on the retrieved fields, and attach the compressed header to the payload. Next, the controller 1430 transmits the data packet through the communication unit 1410.

When the electronic device receives the data, the controller 1430 receives the data packet through the communication unit 1410. The data packet includes the compressed header and the payload. The controller 1430 removes the compressed header and processes the payload of the data without restoring the complete header. For example, the electronic device can process the data without generating the IP/UDP header. When the header required to process the data in the higher layer is compressed together, the controller 1430 can restore the header required to process the data in the higher layer. At this time, the compressed header can be removed by the ROHC module 1434 or the TCP/IP stack 1432.

Such data transmission and reception can be conducted when the IP/UDP header values do not change during the session. For example, the aforementioned operations can be performed in the session for the VoIP call. In this case, the data packet generated and transmitted by the electronic device can include the audio data including the voice. The aforementioned operations can be performed after the initial state of the session. For example, the initial state can be defined as the number of the processed packets. In this case, the controller 1430 can transmit n-ary packets of the predefined number and then operate as mentioned above. For example, the initial state can be defined as the time duration. In this case, after the predefined time, the controller 1430 can perform as stated above.

As set forth above, the electronic device can reduce the power consumption by skipping part of the compression operation of the transmitted data header or the decompression operation of the received data header.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   receiving, from another electronic device, a first data packet comprising a compressed header;
   applying a decompression to the compressed header to restore a header of the first data packet during an initial state of a session, wherein information corresponding to the header of the first data packet is stored in the electronic device during the initial state, processing data of the first data packet by processing the header of the first data packet;
   receiving, from the another electronic device, a second data packet comprising the compressed header; and
   processing data of the second data packet while bypassing the decompression of the compressed header in the second data packet based on the stored information in the electronic device during the session after the initial state,
   wherein header values of the compressed header do not change during the session,
   wherein the first data packet is generated by applying a compression to the header of the first data packet during the initial state, and
   wherein the second data packet is generated by using the stored information during the session after the initial state.

2. The method of claim 1, wherein the initial state comprises a time period during which a number of packets transmitted in the session is less than a threshold number, or a predetermined elapsed time after the session is established.

3. The method of claim 1, wherein the processing of the data of the second data packet during the session after the initial state comprises:
   identifying the second data packet in a packet data convergence protocol (PDCP) layer;
   transferring, from the PDCP layer to a transmission control protocol (TCP)/internet protocol (IP) layer, data of the second data packet by removing the compressed header from the second data packet in the PDCP layer;
   transferring, from the TCP/IP layer to an application layer, the data of the second data packet; and
   processing the data of the second data packet in the application layer.

4. The method of claim 1, wherein the processing of the data of the second data packet during the session after the initial state comprises:
   identifying the second data packet in a packet data convergence protocol (PDCP) layer;
   transferring, from the PDCP layer to a transmission control protocol (TCP)/internet protocol (IP) layer, the second data packet;
   transferring, from the TCP/IP layer to an application layer, the data of the second data packet by removing the compressed header from the second data packet in the TCP/IP layer; and
   processing the data of the second data packet in the application layer.

5. The method of claim 1, wherein the processing of the data of the second data packet during the session after the initial state comprises the processing the data of the second data packet without restoring at least one of an internet protocol (IP) header or a user datagram protocol (UDP) header from the compressed header in the second data packet during the session after the initial state.

6. The method of claim 1, wherein the data of the second data packet comprises a real time protocol (RTP) header and an RTP payload, further comprising:
   restoring the RTP header from a compressed RTP header based on a determination that the compressed header in the second data packet comprises the compressed RTP header.

7. The method of claim 1,
   wherein the header comprises at least one of an internet protocol (IP) header value and a user datagram protocol (UDP) header value, and
   wherein the IP header value and the UDP header value remain unchanged during the session.

8. The method of claim 7, wherein the session comprises a voice over internet protocol (VoIP) call.

9. An electronic device comprising:
   a transceiver; and
   at least one processor, operatively coupled to the transceiver, configured to:
   receive, from another electronic device, a first data packet comprising a compressed header,
   apply a decompression to the compressed header to restore a header of the first data packet during an initial state of a session, wherein information corresponding to the header of the first data packet is stored during the initial state,
   process data of the first data packet by processing the header of the first data packet, receive, from the another electronic device, a second data packet comprising the compressed header, and process data of the second data packet while bypassing the decompression of the compressed header in the second data packet based on the stored information during the session after the initial state, wherein header values of the compressed header do not change during the session, wherein the first data packet is generated by applying a compression to the header of the first data packet during the initial state, and wherein the second data packet is generated by using the stored information during the session after the initial state.

10. The electronic device of claim 9, wherein the initial state comprises a time period during which a number of packets transmitted in the session is less than a threshold number, or a predetermined elapsed time after the session is established.

11. The electronic device of claim 9, wherein the at least one processor is further configured to:

identify the second data packet in a packet data convergence protocol (PDCP) layer, transfer, from the PDCP layer to a transmission control protocol (TCP)/internet protocol (IP) layer, data of the second data packet by removing the compressed header from the second data packet in the PDCP layer, transfer, from the TCP/IP layer to an application layer, the data of the second data packet, and process the data of the second data packet in the application layer.

12. The electronic device of claim 9, wherein the at least one processor is further configured to:

identify the second data packet in a packet data convergence protocol (PDCP) layer, transfer, from the PDCP layer to a transmission control protocol (TCP)/internet protocol (IP) layer, the second data packet, transfer, from the TCP/IP layer to an application layer, the data of the second data packet by removing the compressed header from the second data packet in the TCP/IP layer, and process the data of the second data packet in the application layer.

13. The electronic device of claim 9, wherein the at least one processor is further configured to process the data of the second data packet without restoring at least one of an internet protocol (IP) header or a user datagram protocol (UDP) header from the compressed header in the second data packet during the session after the initial state.

14. The electronic device of claim 9, wherein the data of the second data packet comprises a real time protocol (RTP) header and an RTP payload, and wherein the at least one processor is further configured to restore the RTP header from a compressed RTP header based on a determination that the compressed header in the second data packet comprises the compressed RTP header.

15. The electronic device of claim 9, wherein the header comprises at least one of an internet protocol (IP) header value and a user datagram protocol (UDP) header value, and wherein the IP header value and the UDP header value remain unchanged during the session.

16. The electronic device of claim 15, wherein the session comprises a voice over internet protocol (VoIP) call.

* * * * *